United States Patent [19]
Roos

[11] 3,743,327
[45] July 3, 1973

[54] CORED-OUT FITTING FOR VALVES OR THE LIKE

[75] Inventor: Robert R. Roos, Decatur, Ill.

[73] Assignee: Mueller Co., Decatur, Ill.

[22] Filed: Apr. 6, 1971

[21] Appl. No.: 131,779

[52] U.S. Cl.................. 285/192, 137/323, 285/219
[51] Int. Cl............................................... F16l 5/00
[58] Field of Search.................. 285/192, 189, 219, 285/176; 137/315, 316, 317, 318, 319, 320, 321, 322, 323, 324, 325, 326, 327, 328, 329, 329.01, 329.02, 329.03, 329.04, 329.05, 329.06, 329.1, 329.2, 329.3, 329.4

[56] References Cited
UNITED STATES PATENTS

| | | | |
|---|---|---|---|
| 296,311 | 4/1884 | Brennon | 137/322 X |
| 3,542,063 | 11/1970 | Etter et al. | 137/329.4 X |
| 1,943,941 | 1/1934 | Munn | 137/329.4 |
| 308,161 | 11/1884 | Howard et al. | 137/321 X |
| 449,513 | 3/1891 | Anthony | 137/323 |
| 368,768 | 8/1887 | Hovey | 137/325 |
| 1,599,098 | 9/1926 | Mix | 137/315 X |

*Primary Examiner*—Dave W. Arola
*Attorney*—Cushman, Darby & Cushman

[57] ABSTRACT

A fitting such as a corporation stop for use in connecting a service line to a fluid distribution pipe such as a water main or gas main. The fitting is provided on its inlet end portion with a tapered exterior thread for reception in a tapped hole in the main and with an improved flow passageway therethrough which provides the fitting with better leakage characteristics when installed in the main and also improves the flow characteristics through the fitting. In this respect the flow passageway in the area of the threads of the fitting is cored out to increase the diameter of the flow passageway in an area adjacent the exterior thread of the fitting thus resulting in the flow passageway having a thinner wall thickness in this area than in the areas at the extremeties of the thread.

8 Claims, 6 Drawing Figures

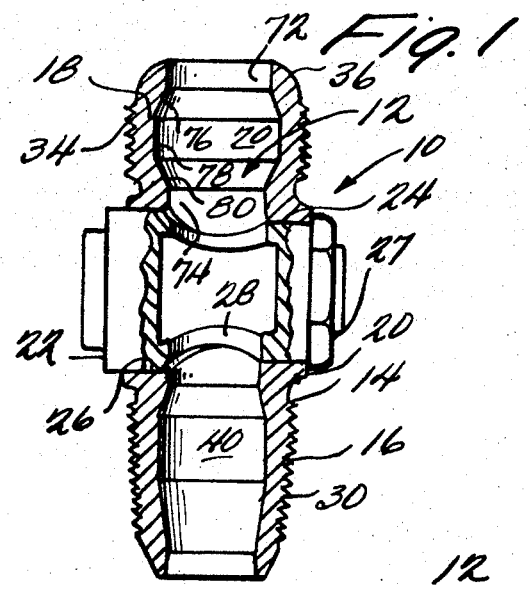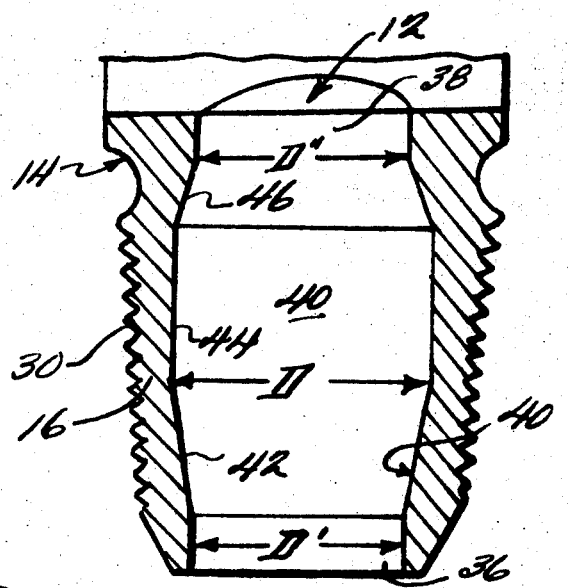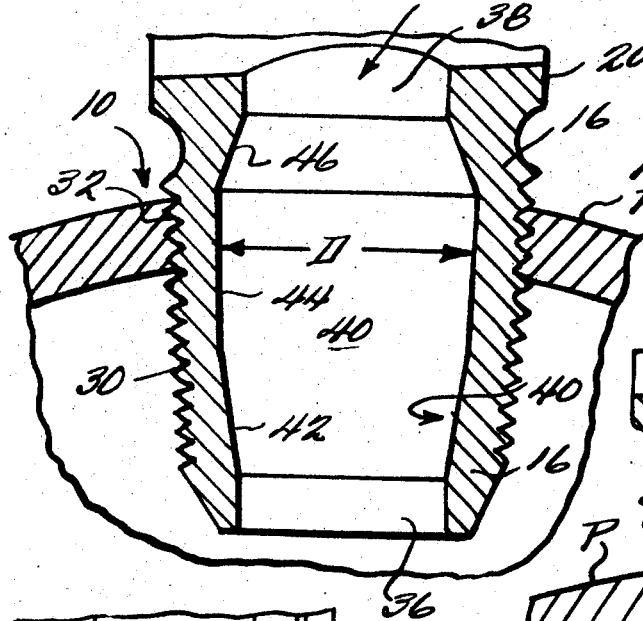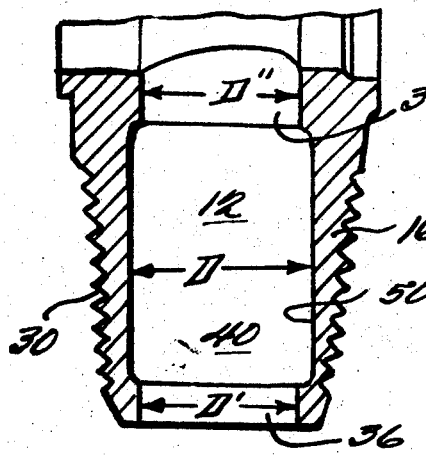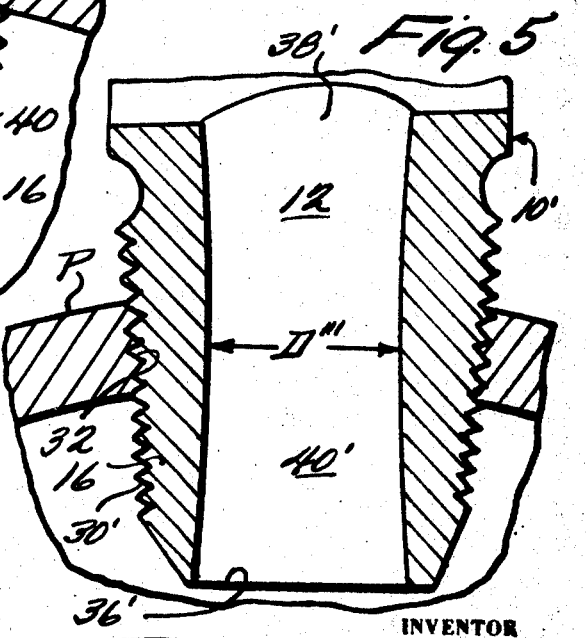

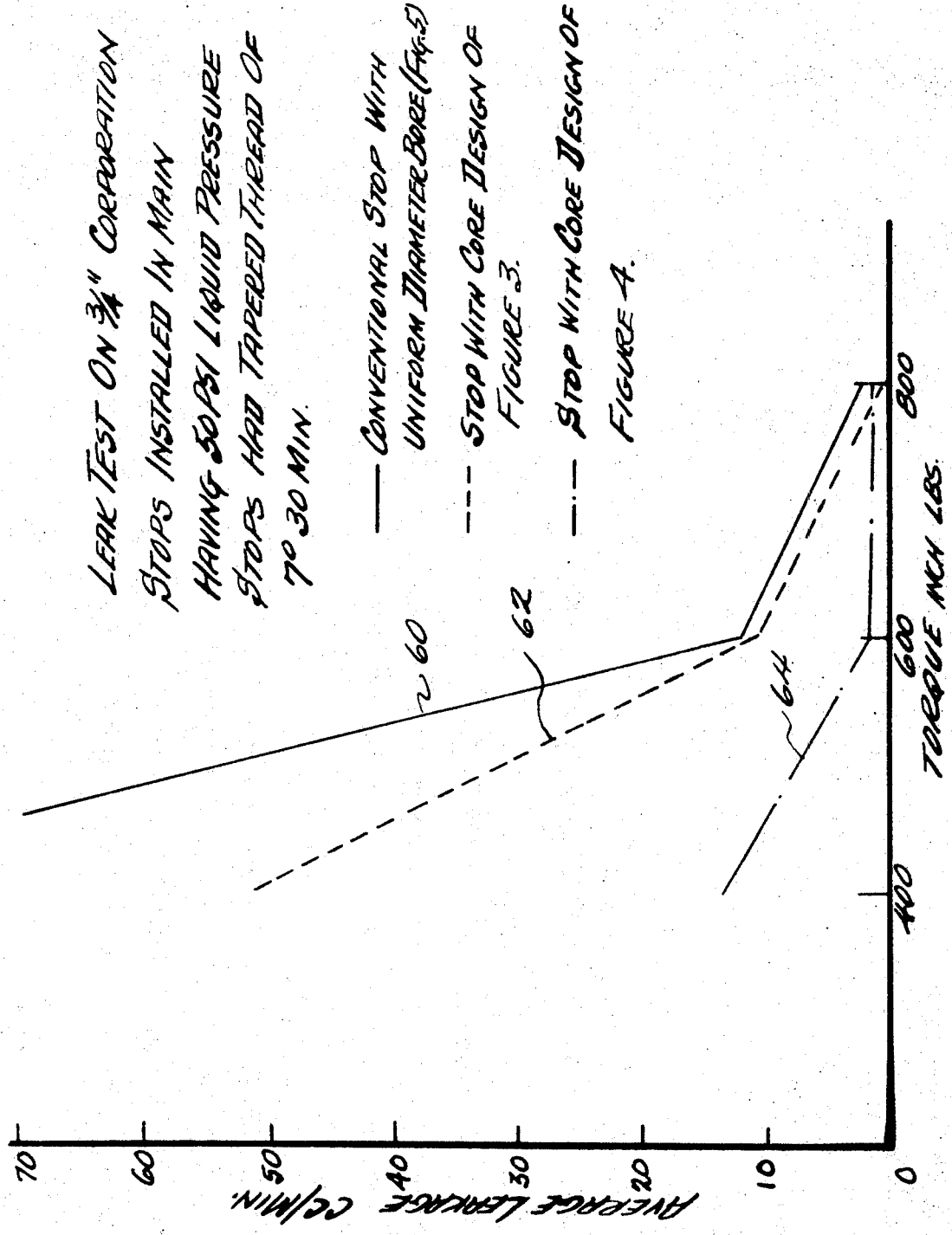

CORED-OUT FITTING FOR VALVES OR THE LIKE

The present invention relates to a fitting for connecting a high pressure main or pipe to a service line in a fluid distribution system such as water or gas, the fitting having an improved flow passageway therethrough which upgrades the leakage performance as well as provides for good flow characteristics with no increase in flow pressure loss over conventional fittings.

BACKGROUND OF THE INVENTION

Fittings for connecting service lines to mains or pipes are commonly referred to as corporation stops. Such corporation stops includes a valve therein which is closed during installation into the main and opened when the service line has been connected thereto and service is desired. Corporation stops heretofore used included a brass body having an inlet end portion and an outlet end portion thereon with valve means intermediate the two, the inlet end portion being provided with a tapered exterior thread for reception in a tapped hole in the main or pipe, the main or pipe usually being iron. A valve seat was ground in the body and it intersected the flow passageway therethrough, the ground seat receiving a ground valve member or key with an opening therethrough arranged to be aligned and disaligned with the flow passageway. The flow passageway extending through the inlet end portion and the outlet end portion of the body was defined by a bore of uniform diameter therethrough to provide for smooth flow of fluid.

When the inlet end portion with the exterior tapered thread thereon of the corporation stop was inserted into the tapped hole on the main, there was some slight collapsing or flowing of the metal in the inlet end portion as the metal of the pipe was more rigid and this caused the bore diameter in the area of the mating threads to be slightly reduced. This resulted in a venturi effect in the inlet portion of the flow passageway and consequently there was some loss of pressure due to the slight restriction in the flow passageway.

BRIEF SUMMARY OF THE INVENTION

With the increasing cost of brass efforts are being made to reduce the amount of brass in fittings such as corporation stops or service tees and the like. Only so much brass can be removed from the exterior of the body housing and wherever possible this is being done with the brass removed being saved and recycled. In the present invention brass is reduced from within the body of the fitting and applicant has accomplished this by coring out the flow passageway in both the inlet end portion and the outlet end portion of the fitting without changing the size of the inlet and outlet ports. By coring out the inlet end portion which has the tapered exterior thread thereon, the diameter of the flow passageway therein in the area intermediate the ends of the thread is increased over the diameter of the flow passageway in the areas of the axial extents of the thread and when the fitting is threaded into the main, there is a flow of metal in the inlet end portion adjacent the area intermediate the ends of the exterior thread which results in a reduction in the final diameter but such reduction is not less than the diameter of the flow passageway in the areas at the ends of the axial extent of the passageway in the inlet end portion. Since the wall thickness is less in the cored out area over that of a comparable conventional corporation stop having a uniform bore therethrough, the cooperating threads between the inlet end portion of the stop and the tapped hole make a tighter seal and additionally, there is no adverse venturi effect to increase pressure loss within the fitting when there is flow therethrough.

Substantial cost savings result in the amount of brass reduced from the interior of the corporation stop by the coring out of the flow passageway in the inlet and outlet end portions thereof as the brass is saved.

While the invention is being described in connection with a fitting such as a corporation stop, it will be understood that the invention will also be applicable to fittings such as service tees or the like which utilize a tapered thread on the inlet portion thereof for reception in a tapped hole on the main irregardless of whether the hole is made directly in the main or is in a clamp attached to the main.

BRIEF DESCRIPTION OF THE DRAWINGS

FIG. 1 is a sectional view, partly in elevation, through a corporation stop embodying the present invention.

FIG. 2 is an enlarged fragmentary sectional view of the inlet end portion of the corporation stop of FIG. 1 disclosing the cored out flow passageway therein, the view also disclosing the inlet end portion prior to insertion into the main.

FIG. 3 is a fragmentary sectional view similar to FIG. 2 but illustrating the inlet portion after insertion of the stop in the main.

FIG. 4 is a sectional view of a modified inlet end portion of a corporation stop made according to the present invention, the view being taken prior to insertion into the main.

FIG. 5 is an enlarged fragmentary sectional view of an inlet end portion of a conventional corporation stop the flow passageway therein having uniform diameter prior to insertion, the view illustrating diagramatically the changes in configuration of the flow passageway after insertion into the main.

FIG. 6 is a graph illustrating comparative leak tests on ¾ inch corporation stops installed in a main and of the types shown in FIGS. 3, 4 and 5 respectively.

DETAILED DESCRIPTION OF THE INVENTION

Referring now to the drawings wherein like character and reference numerals represent like and similar parts and in particular to FIG. 1, there is disclosed a corporation stop generally indicated at 10 of the present invention, the stop being preferably made of brass and having a flow passageway 12 therethrough. The stop 10 includes a body member 14 having an inlet end portion 16 and an outlet end portion 18. Intermediate the inlet end portion 16 and the outlet end portion 18 there is provided a center portion 20 which houses a tapered valve member or key 22, the key having a ground seat 24 for cooperating with a tapered ground valve seat 26 provided in the center portion. A nut 27 holds the key 22 in the seat. Key or valve member 22 has an opening 28 therethrough which is arranged to be aligned with the passageway 12 when it is desired to have flow through the fitting or stop 10.

The inlet end portion 16 has a tapered thread 30 on its exterior for cooperating with a tapped hole 32 (FIG. 3) in a pipe or main P. The outlet end portion 18 is externally threaded as indicated at 34 and is provided with a convex surface 36 on its end to receive the flared end of a service line not shown. Usually the thread 34 is a conventional straight thread.

Referring now to FIGS. 2 and 3, the inlet end portion 16 has an inlet port 36 and an outlet port 38 opening to the valve seat 26. These ports 36 and 38 are of a predetermined diameter and form the extremeties of a bore 40 which forms a part or portion of the flow passageway 12. The bore 40 is initially formed of uniform diameter equalling the diameter of the ports 36 and 38 and after such forming, the bore 40 is cored out intermediate its ends to provide a diverging wall 42 merging into a cylindrical wall 44 which in turn merges into a converging wall 46 that terminates at port 38. As will be seen by observance of FIG. 2, which represents the inlet end portion 16 of the fitting 10 prior to insertion into the tapped end 32 of the pipe P, the final shape of the bore 40 is such that the inlet end portion 16 has a maximum diameter D in the area intermediate the ends of the exterior thread 30 which is substantially greater than the diameters D' and D'' in the areas at the extremeties of the thread 30 and at the ports 36 and 38. The wall thickness of the inlet end portion 16 intermediate the ports 36 and 38 is less than at the ports.

Referring now specifically to FIG. 3 there is disclosed the inlet end portion 16 threaded into the tapped hole 32 in the pipe P at a torque in the neighborhood of 600 inch pounds which is the normal torque for threading such a fitting 10 into an iron pipe. As the inlet end portion 16 is progressively threaded into the tapped hole 32, the metal in the inlet end portion 16 will flow slightly because such metal is softer than the metal in the pipe P and when the proper torque has been applied to the fitting, the diameter D in the area of the mating threads 30 and 32 reduces over the diameter D shown in FIG. 2. However, this diameter is still greater than the diameters D' and D'' at ends or ports 36 and 38 of the bore 40 and, thus, there is little or no pressure loss as a venturi effect is substantially eliminated. The wall thickness of the cored out portion of bore 40 is less than the wall thickness of a comparable conventional stop and thus the exterior thread 30 conforms better to the thread of the tapped hole 32 and thus, the leakage characteristics between the fitting and the pipe are improved.

Referring to FIG. 5, there is disclosed the inlet end portion 16' of a conventional stop 10', the view showing the inlet portion threaded into the tapped hole 32 of pipe P. The tapered exterior thread 30' is identical to the thread 30 of the FIG. 2 arrangement but the bore 40 prior to insertion is a straight bore having a uniform diameter throughout and, thus, the wall thickness of the inlet end portion 16' progressively increases from the port 36' toward the port 38'. The inlet port 36' and the outlet port 38' have the same diameter as the diameter of the ports 36 and 38 respectively of FIG. 2, both before and after insertion, but it will be noted that the diameter D''' of the bore 40' in the area of the cooperating threads 30' and 32 have reduced to less than the diameter of the ports 36' and 38' and consequently a venturi effect is created. Also, because of the increasing wall thickness of the inlet end portion 16' the metal in the area of cooperating threads does not flow as readily upon approaching normal torque.

Referring to FIG. 4 there is disclosed a modification of the inlet end portion 16 of the present invention. In this modification the cored out bore 40 in the inlet end portion 16 instead of being provided with a diverging wall merging into a cylindrical wall which in turn merges into a converging wall, is provided with a cored out counter bore 50 defining a cylindrical wall extending axially about the axial extent of the exterior thread 30. The diameter D of the wall 50 both before and after insertion of the inlet end portion 16 into the pipe is greater than the diameters of the ports 36 and 38 although the diameter D of the wall 50 does reduce upon the insertion of the inlet end portion 16 into the tapped hole 32 just as in the situation with respect to FIG. 3.

It will be noted by reference to FIGS. 3 and 5 that in the fully inserted positions, the inlet end portion 16 of the present invention can be inserted almost to the end of the thread 30 whereas the fitting 10' has its inlet portion 16' inserted only about a little over half way with several threads exposed. Even though both fittings are inserted with the same torque, which is a normal torque of about 600 inch pounds, this can occur because the wall thickness in the fitting 10 is less than the wall thickness in the fitting 10' and thus an over torque is effectively prevented in the fitting 10 of the present invention. If over torque occurs, this can cause leakage.

Referring now to FIG. 6 there is disclosed a graph showing comparative leak tests between three corporation stops having identical construction other than in their flow passageway configuration. Each of the stops tested had inlet and outlet ports of their inlet end portions identical, namely, three-fourth inch in diameter. The pipe into which the stops were inserted was under 50 pounds per square inch fluid pressure and each of the stops had an exterior tapered thread of 7° 30 min. The full line curve represented the conventional stop of FIG. 5 and is identified by the numeral 60 whereas the broken line curve 62 represented the stop of FIG. 3 and the dash-dot line curve 64 represented the modification shown in FIG. 4. It will be apparent that as the torque was increased on each of the stops tested the leakage measured in cubic centimeters per minute decreased and the stops of curves 62 and 64 were substantially better from a leakage standpoint up to 600 inch pounds which is the normal torque application for such stops.

Similar leakage tests were performed on stops differing from those just previously described only by the degree of taper (7° 2 min.) of the exterior thread on the inlet end portion. The results of these tests were similar in respect to the three different stops although the amount of leakage for each of the stops was slightly less.

Flow tests measuring the pressure loss in inches of mercury against the flow in gallons per minute through the stops were conducted for the three stops mentioned above and although it would have been expected the stops of the present invention would have had a greater pressure loss, these tests disclose the pressure loss for the stops of the present invention to be about the same and in most instances slightly better than for the conventional stops.

As shown in FIG. 1 the outlet end portion 18 for the corporation stop 10 is similarly formed with a bore 70 forming part of the flow passageway 12. This bore 70 is also cored out between ports 72 and 74 so that it is provided with a diverging wall 76 merging into a cylindrical wall 78 which in turn merges into a converging wall 80. It has been estimated that the cost savings per year in brass by making a stop with a cored out inlet end portion and a cored out outlet end portion as compared to making a conventional stop which has a passageway therethrough of uniform diameter is in the neighborhood of $7,200 for one particular size of corporation stop. In obtaining these figures, the number of conventional stops for a particular size sold during the previous year was in the order of 311,000 with the cost of brass per pound at $0.52. The coring out of this particular size stop resulted in a savings of 0.04467 pounds of brass per stop and this multiplied by the number of stops made and the price per pound of brass resulted in about a $7,200 savings in brass. This, coupled with the unexpected improvement in leakage with no adverse effects in flow characteristics results in the novel and inventive stop of the present invention.

The terminology used in this specification is for the purpose of description and not limitation, the fitting of the invention being defined by the claims.

What is claimed is:

1. A fitting for connecting a service line to a fluid distribution pipe, said fitting having an inlet end portion and an outlet end portion with a threadless fluid flow passage extending therethrough, said inlet end portion being defined by imperforate wall means having a tapered exterior thread thereon for reception in a tapped hole of the pipe, and a portion of said flow passage which extends through said inlet end portion of the fitting being defined by an unobstructed smooth wall bore extending at least the length of said exterior thread and having a cored out portion intermediate its ends and in an area intermediate the ends of said thread to provide a greater diameter than the diameter of said bore at its ends and a wall thickness in said inlet portion at a position intermediate the ends of said thread which is thinner than the wall thickness at the ends of said thread, said thinner wall thickness permitting the greater diameter of said bore to reduce toward the diameter of said bore at its ends when said fitting is threaded into the tapped hole in the pipe thereby improving leak resistance of the fitting with the pipe and flow characteristics of fluid through said bore.

2. A fitting as claimed in claim 1 wherein said cored out portion of said bore through said inlet end portion is defined by a diverging wall merging into a converging wall.

3. A fitting as claimed in claim 2 wherein said cored out portion of said bore has a cylindrical wall of maximum diameter intermediate said diverging and converging walls.

4. A fitting as claimed in claim 1 wherein said cored out portion of said bore is a counter bore defining a cylindrical wall having a greater diameter than the diameter of the ends of said bore.

5. A fitting as claimed in claim 1 wherein said outlet end portion has an exterior thread thereon and wherein a portion of said flow passageway extending through said outlet end portion is defined by an unobstructed bore having a cored out portion intermediate its ends.

6. A fitting as claimed in claim 5 in which said cored out portion of said bore through said inlet end portion and said cored out portion of said bore through said outlet end portion are each defined by a diverging wall merging into a converging wall.

7. A fitting as claimed in claim 6 including a cylindrical wall intermediate said diverging and converging walls of each of said bores.

8. A fitting as claimed in claim 1 wherein said fitting is brass.

* * * * *